United States Patent [19]

Lamprecht et al.

[11] Patent Number: 4,954,422

[45] Date of Patent: Sep. 4, 1990

[54] RECORDING MATERIAL CONTAINING A LAYER OF POLYMER PARTICLES AND A SUPERIMPOSED METALLIC LAYER

[75] Inventors: Josef Lamprecht, Frankenthal; Gregor Ley, Wattenheim; Arend Werner; Helmut Barzynski, both of Bad Duerkheim, all of Fed. Rep. of Germany

[73] Assignee: BASF Aktiengesellschaft, Ludwigshafen, Fed. Rep. of Germany

[21] Appl. No.: 296,962

[22] Filed: Jan. 13, 1989

Related U.S. Application Data

[62] Division of Ser. No. 66,999, Jun. 29, 1987, abandoned.

[30] Foreign Application Priority Data

Jun. 27, 1986 [DE] Fed. Rep. of Germany ....... 3621685

[51] Int. Cl.$^5$ ........................... G03C 1/72; G03C 1/94

[52] U.S. Cl. ..................................... 430/275; 430/494; 430/944; 430/945; 346/135.1; 346/76 L; 369/284; 369/285

[58] Field of Search ....................... 430/65, 145, 147, , 430/275, 944, 945, 494; 346/135.1, 76 L; 369/284, 285

[56] References Cited

U.S. PATENT DOCUMENTS 4,032,691 6/1977 Kido et al. ........................... 428/457
4,840,873 6/1989 Kobayashi et al. .............. 430/275 X Primary Examiner—Paul R. Michl
Assistant Examiner—Cynthia Hamilton
Attorney, Agent, or Firm—Keil & Weinkauf

[57] ABSTRACT

A photosensitive recording material for recording information by means of a local change in the optical properties of a recording layer under the action of light having a high energy density, and a process for its preparation.

3 Claims, No Drawings

RECORDING MATERIAL CONTAINING A LAYER OF POLYMER PARTICLES AND A SUPERIMPOSED METALLIC LAYER

This is a division of application Ser. No. 066,999, filed June 29, 1987, now abandoned.

The present invention relates to a photosensitive recording material for recording information by means of a local change in the optical properties of a recording layer under the action of light having a high energy density, and a process for its preparation.

The known recording materials for recording information with the use of an intense radiation source include both thermal and chemical recording materials.

In some thermal recording materials, the recording layer has a high optical density in the wavelength range of the radiation and absorbs an incident light beam of high energy density. This causes a local temperature increase, which produces thermal deformation, for example as a result of melting, vaporization or aggregation. Consequently, the exposed parts are removed or change their optical character, for example by assuming different optical density compared with the unexposed parts, with the result that the light information is recorded. For this reason, the thermal recording materials are used, for example, for lithographic printing films, facsimile recording materials, photomasks for integrated circuits, and microfilms.

A review of chemical, thermographic recording materials is given in Light Sensitive Systems by J. Kosar, page 402 et seq. J. Wiley and Sons, New York, London, Sydney (1965).

Thin coherent metal layers too can be used as a recording material for high-energy light. The recording materials known for this purpose essentially consist of a base and a thin layer of a metal or semimetal, e.g. Bi, Sn, In, Al, Te or Cr. Although they have a high resolving power and high contrast, they have a reflectance, for example for laser light, of more than 50%, so that the energy of the laser light cannot be effectively utilized by these recording materials. It is for this reason that the light energy required for recording is high and a laser source having a high output power is necessary for recording a high-speed scan, making the recording apparatuses larger and more expensive.

To reduce the reflectance of a coherent semiconductor or metal layer and consequently increase the radiant power absorbed by the layer, EP-A No. 01 07 379 proposed using a plastic substrate texturized by laser interferometry and having a metal layer applied by vapor deposition. Another proposal (Appl. Phys. Lett. 40 (1982), 622 et seq.) relates to texturization of a vapor-deposited Ge layer by ionic etching. Texturizing by the use of particulate metal or semiconductor layers is also known. For example, U.S. Pat. No. 4,252,890 describes a photographic recording material which consists of a monolayer of low-melting Se particles having a diameter of about 0.2 $\mu$m, and EP-A No. 00 83 396 describes a particulate Au layer consisting of Au islands having a diameter of about 10 nm and applied by vapor deposition.

However, all of the systems stated require very expensive production processes, for example large-area laser holograms and/or complicated etching techniques. The fact that some processes for manufacturing the systems consist of many individual steps, the poor reproducibility and the complicated handling are further disadvantages. Moreover, some systems have a very considerable disadvantage in that they require the use of toxic layer materials and/or layer materials which have a short shelf life.

It is an object of the present invention to provide a photosensitive recording material which avoids the stated disadvantages and permits reproducible and uniform optical recording with high sensitivity and high contrast in a wide spectral range and moreover can be prepared in a simple manner.

We have found that this object is achieved by a photosensitive recording material for recording information by means of a local change in the optical properties of a recording layer under the action of light having a high energy density, essentially consisting of a base, a particulate layer of virtually spherical particles which is present on the said base, and a metallic layer applied on top of this, if the virtually spherical particles of the particulate layer consist of an organic polymer having a softening point above 50° C. and have a mean particle diameter of not more than 5000 nm. In a preferred embodiment, the said particles consist of a polymer having a softening point of from 50 to 150° C. and have a mean particle diameter of from 30 to 5000 nm, in particular from 50 to 800 nm.

The novel recording materials are distinguished by little or no reflectivity in the entire spectral range from 200 nm to 2 $\mu$m, i.e. in the UV, visible and near infrared range, the residual reflection spectra depending on the metal or semimetal layers used and on their thickness. However, the reflectivity of the recording material increases dramatically under the action of light radiation of high energy density, e.g. electronic flash or a laser. This change in reflectivity is probably due to brief thermal softening and coalescing of the spherical polymer particles, possibly producing a change in the surface structure of the metallic layer present on top.

Suitable bases for the novel recording materials are sheet-like, dimensionally stable structures in the form of disks or sheets of glass, polyester, polystyrene, polymethyl methacrylate, polycarbonate, polymethylpentene, polysulfone, polyimides, polystyrene copolymers, PVC copolymers, cellulose esters and other plastics, as well as polished metal sheets and wood. Transparent bases of low thermal conductivity are preferred.

The particles of the novel recording material which form the particulate layer can be prepared from a very wide variety of polymers. Thermoplastic polymers, which are obtainable by polymerization, polycondensation or polyaddition, are most suitable for this purpose. The only thermosetting plastics which can be used are those which exhibit little crosslinking and are therefore still sufficiently plastic at above 50° C.

Virtually spherical particles having the required mean particle diameter of not more than 5000 nm can be prepared from these plastics by a wide variety of methods. For example, the methods in which more or less concentrated solutions of such thermoplastics are divided by, for example, atomizing, spraying, emulsification, dispersing, milling etc., are widely applicable to a very broad range of thermoplastics. Spray drying is an example of the physically determined methods, while the preparation of secondary dispersions is an example of the chemically determined ones. In the latter method, controlled chemical operations, such as the ionization of groups introduced in a certain concentration into the thermoplastic during its synthesis, can be used to force emulsification and to control the mean particle size of the secondary dispersions.

Processes in which a physical method of division is used in conjunction with chemical assistants occupy an intermediate position, the emulsifiers, dispersants, protective colloids etc. generally being responsible for stabilizing the disperse state. These methods are extremely varied and, as is known, can be used for the preparation of corresponding particles having either a homogeneous or an inhomogeneous internal structure (e.g. microcapsules). In some of these methods, preparation of the plastics takes place partly or completely in the disperse state, as, for example, in the case of curing, i.e. molecular enlargement or crosslinking of the capsule wall, in the microencapsulation methods.

In another group of methods, the macromolecular plastic is produced directly in the required form of virtually spherical particles from its components. These methods include, for example, suspension and emulsion polymerization. Emulsion polymerization is particularly suitable for the preparation of particles for the particulate layer, since this method of polymerization preferentially gives particles of the required size, has been very thoroughly investigated owing to its considerable industrial importance and is very simple to carry out. It is therefore also preferred as a process for the preparation of these particles.

For an overview of emulsion polymerization, reference may be made to Houben-Weyl, Makromolekulare Stoffe or to Polymerisationstechnik in Ullmann. Monographs such as H. Gerrens, Kinetik der Emulsionspolymerisation, Fortschr. Hochpolym.-Forsch., 1 (1959), 234–328, or J. Ugelstad and F. K. Hansen, Kinetics and Mechanism of Emulsion Polymerization, Rubber Chemistry Technol. 49 (1976), 536–609, give a good idea of the theoretical and practical aspects of the process. The simple adjustment of the softening point of the polymer by emulsion copolymerization of appropriate amounts of vinyl and (meth)acrylic monomers and styrene, which are available industrially in high purity, the simple, readily reproducible adjustment of the mean particle size of the resulting stable dispersion according to the known rules of emulsion polymerization, and the relatively simple growth of dispersions having a very narrow particle size distribution (monodisperse dispersions), whose particles are frequently capable of spontaneously forming macroscopic ordered associations at relatively high concentrations, i.e. latex crystals, are particularly important with regard to the use of this technique for the preparation of these particles for the particulate layer.

Regarding the techniques for the preparation of monodisperse particles having the preferred particle size range, reference may be made to, inter alia, I. M. Krieger et al. J. Paint Technol. 40 (1967), 545, ibid. 42 (1970), 71 and 571, A. Kotera et al. Kolloid Z., Z. f. Polymere 239 (1970), 677, and J. Ugelstad, U.S. Pat. No. 4,336,173.

The particulate layer is applied to the base by a conventional method, such as immersion, spin-coating, spraying or knife-coating.

Spin-coating from an aqueous emulsion which may be diluted with water-miscible organic solvents is preferred. The particulate layer is brought to the desired thickness essentially by varying the particle concentration and the rotary speed. This thickness usually corresponds to a monolayer of the virtually spherical particles. However, layer thicknesses of up to 5 monolayers can readily be obtained.

This particulate layer is then coated with a thin film of a material which possesses high reflectivity and high absorption in the wavelength range of interest. A metal or semimetal, such as Au, Ag, Al, Cu, Bi, Sn, Sb, Pt, Ni, Te etc., is preferably used. The thickness of this metal layer depends on the use and the required sensitivity of the recording material. A thin Au layer about 10 nm thick is very ductile and does not to any great extent prevent the change in the shape of the particulate layer at the transition between the two layers during exposure. On the other hand, however, the transmittance of the recording material is substantially higher than 0. A thick Au layer of about 0.1 $\mu$m reduces the transmittance to 0 but prevents deformation of the particulate layer at the transition between the two layers during exposure. The thickness of the metal layer is therefore determined by the optical and mechanical properties of the material used. The thickness is preferably from 10 nm to 0.1 $\mu$m, but substantially thicker layers can also be used.

The metal layer is preferably applied by a vapor deposition under greatly reduced pressure. However, other coating methods, e.g. cathode sputtering or CVD, can also be used.

The novel recording materials are useful for a large number of applications, for example for the production of conductive structures and resistive structures at the microlevel, microfilm recording, patterns for integrated circuits, optical data stores, printed circuits and decorative and other applications.

The novel recording materials are exposed to light sources in the wavelength range from 200 nm to 2 $\mu$m, the energy of the incident radiation being from not less than 0.1 to 10 J/cm$^2$; this upper limit does not represent the range of functioning of the photosensitive recording material but merely relates to the reasonable level of technical complexity. Suitable radiation sources are flash units, mercury lamps, high pressure xenon lamps, gas lasers, e.g. helium/neon, argon, krypton, argon and krypton fluoride lasers, semiconductor lasers, such as Ga arsenide lasers, Nd-YAG lasers and dye lasers.

The preparation of the imagewise structured products does not involve any protection from wet development. This is particularly advantageous with regard to high resolution and environmental compatibility.

The structure of the novel recording materials consisting of the base, the particulate layer and the metallic layer can be further extended by additional layers, such as interference control layers, dielectric layers and spacer layers. Furthermore, two novel recording materials can be connected to one another in the form of a sandwich.

The specific layer structure required is determined by the intended use.

Since an important property of the novel recording material is the drastic reduction in the reflectivity of the metallic layer, there is another important use which is not related to imagewise exposure. This is the use of the said recording material for reducing the reflectance of optical surfaces, such as glass panes, covers on television tubes and displays.

The Examples which follow illustrate the invention.

EXAMPLE 1

The optical recording material consists of a PMMA sheet having a diameter of 12 cm and a thickness of 1.2 mm, a layer of polystyrene spheres of 0.2 μm diameter, applied by spin-coating from a 20% strength polystyrene dispersion in water/n-propanol containing 1% of PVA, and a 50 nm thick Au layer applied by vapor deposition. Viewed through the PMMA substrate in reflected light, the recording material appears dark brown; viewed through the metallized back in reflected light, the recording material has the appearance of a dark Au mirror. If the layer is exposed to an electronic flash (10 nJ/μm$^2$) through the PMMA substrate or from the back, the same change occurs in both cases: the dark brown coloration observed when viewing through the PMMA substrate becomes pale brown, i.e. the reflectivity is substantially increased. If exposure is effected through a transparency, the transparency is reproduced by the recording material.

EXAMPLE 2

A PMMA sheet is produced as described in Example 1, a 50 nm thick Al layer being applied by vapor deposition, instead of gold. Viewed through the PMMA substrate in reflected light, the recording material appears bluish; viewed through the metallized back, the recording material has a pale silver appearance. If the layer is exposed to an electronic flash unit (10 nJ/μm$^2$) through the PMMA substrate or from the back, the bluish coloration becomes dark grey when viewed through the PMMA substrate, i.e. the reflectivity is substantially reduced. If exposure is effected through a transparency, the latter is reproduced by the recording material.

EXAMPLE 3

A recording material is prepared as described in Example 1. Exposure is carried out through the PMMA layer, using a krypton laser (647 nm, 100 mW, focus diameter 100 μm), the recording material being moved at a speed of 1.3 cm/sec. The energy of the incident light, i.e. 100 nJ/μm$^2$, causes a change in the reflectivity, as described in Example 1.

EXAMPLE 4

A recording material prepared as described in Example 1 is covered with a mask which has a line pattern, and then exposed to an electronic flash. Because the polystyrene spheres in the exposed areas are fused together or to the PMMA substrate, the adhesion of the metal layer to the base is greatly increased in comparison with the unexposed areas. If a transparent self-adhesive foil is then stuck to the imagewise exposed part of the recording material, on the metallized side, when the foil is peeled off the exposed parts remain on the PMMA substrate and the metal film of the unexposed areas is transferred to the foil. When the foil is stuck onto a white or transparent base, a sharp, very high-contrast copy of the pale/dark transparency is obtained.

EXAMPLE 6

The procedure described in Example 4 is modified by drawing a conductor path structure directly with a laser beam. In this way, conductor path widths down to 10 μm can be obtained.

EXAMPLE 7

A 1 mm thick polycarbonate disk which has a diameter of 130 mm and a central hole of 15 mm diameter and is provided with a spiral track (1.6 μm spacing) is coated by spin-coating with a 20% strength polymethyl methacrylate dispersion (particle diameter 0.05 μ) in water/n-propanol in such a way that, after the water has been spun off, a 70 nm layer remains. A 50 nm thick Au layer is then applied to this layer by vapor deposition. 2 such disks are bonded in the form of a sandwich with the aid of 0.5 mm thick spacer rings provided with a contact adhesive.

Digital data in the form of dots are recorded on the resulting optical data store using a laser (wavelength 820 nm), the recording threshold being 1 nJ per mark at a recording power of 9.5 mW.

EXAMPLE 8

The procedure described in Example 1 is followed, except that, instead of the gold layer, a silica layer is applied by vapor deposition. A recording material of this type has a substantially lower reflectivity than that obtained as described in Example 1.

We claim:

1. A photosensitive recording material for recording information by means of a local change in the properties of a recording layer under the action of light having a high energy density, which recording material consists essentially of
   (a) a base;
   (b) a particulate layer consisting of virtually spherical particles on said base, said particles being formed from an organic polymer having a softening point above 50° C. and having a mean particle diameter of not more than 5,000 nm; and
   (c) a metallic layer applied to the top of the particulate layer.

2. The photosensitive recording material of claim 1, wherein the particles have a mean particle diameter from 50 to 800 nm.

3. The photosensitive recording material of claim 1, wherein the virtually spherical particles of the particulate layer consist of an organic polymer having a softening point of from 50 to 150° C. and a mean particle diameter of from 30 to 5000 nm.

* * * * *